(12) United States Patent
Liu et al.

(10) Patent No.: US 10,677,147 B2
(45) Date of Patent: Jun. 9, 2020

(54) ELECTRICALLY-ASSISTED TURBOCHARGER

(71) Applicant: GM Global Technology Operations LLC, Detroit, MI (US)

(72) Inventors: Jim Liu, Pudong (CN); Bin Zhu, Shanghai (CN); Jian Yao, Shanghai (CN); Claus Juergen Glahn, Remscheid (DE)

(73) Assignee: GM Global Technology Operations LLC, Detroit, MI (US)

( * ) Notice: Subject to any disclaimer, the term of this patent is extended or adjusted under 35 U.S.C. 154(b) by 85 days.

(21) Appl. No.: 15/843,640

(22) Filed: Dec. 15, 2017

(65) Prior Publication Data

US 2019/0186348 A1 Jun. 20, 2019

(51) Int. Cl.
| | | |
|---|---|---|
| *F02B 37/00* | (2006.01) | |
| *F02B 37/10* | (2006.01) | |
| *F02B 39/10* | (2006.01) | |
| *F02B 37/013* | (2006.01) | |
| *F02B 37/14* | (2006.01) | |
| *F16D 41/00* | (2006.01) | |

(52) U.S. Cl.
CPC ............ *F02B 37/10* (2013.01); *F02B 37/013* (2013.01); *F02B 37/14* (2013.01); *F02B 39/10* (2013.01); *F16D 41/00* (2013.01)

(58) Field of Classification Search
CPC ........ F02B 37/013; F02B 37/10; F02B 37/14; F02B 39/10; F02C 6/12; F16D 41/00; F02D 23/00; F01D 5/26; F05D 2220/40; F05D 2220/76; F16C 2360/24; H02K 7/1823

USPC ........................................ 60/605.1, 607, 608
See application file for complete search history.

(56) References Cited

U.S. PATENT DOCUMENTS

| | | | | |
|---|---|---|---|---|
| 2,570,101 | A * | 10/1951 | Couling ................ | F02B 37/105 60/608 |
| 2,585,968 | A * | 2/1952 | Schneider ............. | F02B 37/105 60/345 |
| 2013/0118850 | A1* | 5/2013 | Atmaram ................ | F16H 61/06 192/3.54 |
| 2013/0269342 | A1* | 10/2013 | Oh .......................... | F02B 33/00 60/607 |

* cited by examiner

*Primary Examiner* — Thai Ba Trieu
*Assistant Examiner* — Dapinder Singh
(74) *Attorney, Agent, or Firm* — Quinn IP Law

(57) ABSTRACT

A turbocharging system for an internal combustion engine includes a turbocharger having a shaft supported for rotation about an axis. The turbocharger also includes a turbine wheel mounted on the shaft and configured to be rotated about the axis by the exhaust gas, and a compressor assembly mounted on the shaft and configured to pressurize an airflow received from the ambient for delivery to the cylinder. The turbocharging system additionally includes an electric motor configured to generate electric motor torque. The turbocharging system further includes a one-way clutch configured to selectively connect the electric motor to the compressor assembly, such that the electric motor torque assists the turbocharger in generating boost pressure. An internal combustion engine employing such a turbocharging system is also disclosed.

16 Claims, 5 Drawing Sheets

ELECTRICALLY-ASSISTED TURBOCHARGER

INTRODUCTION

The present disclosure relates to an electrically-assisted exhaust gas driven turbocharger for an internal combustion engine.

Internal combustion engines (ICE) are often called upon to generate considerable levels of power for prolonged periods of time on a dependable basis. Many such ICE assemblies employ a supercharging device, such as an exhaust gas turbine driven turbocharger, to compress the airflow before it enters the intake manifold of the engine in order to increase power and efficiency.

Specifically, a turbocharger is a centrifugal gas compressor that forces more air and, thus, more oxygen into the combustion chambers of the ICE than is otherwise achievable with ambient atmospheric pressure. The additional mass of oxygen-containing air that is forced into the ICE improves the engine's volumetric efficiency, allowing it to burn more fuel in a given cycle, and thereby produce more power.

A typical exhaust gas driven turbocharger includes a central shaft that is supported by one or more bearings and transmits rotational motion between a turbine wheel and an air compressor wheel. Both the turbine and compressor wheels are fixed to the shaft, which, in combination with various bearing components, constitute the turbocharger's rotating assembly. Turbochargers frequently employ wastegate valves to limit operational speeds of the rotating assembly in order to maintain turbocharger boost within prescribed limits and prevent rotating assembly over speed.

SUMMARY

One embodiment of the disclosure is directed to a turbocharging system for an internal combustion engine. The turbocharging system includes a turbocharger having a shaft supported for rotation about an axis. The turbocharger also includes a turbine wheel mounted on the shaft and configured to be rotated about the axis by the exhaust gas, and a compressor assembly mounted on the shaft and configured to pressurize an airflow received from the ambient for delivery to the cylinder. The turbocharging system additionally includes an electric motor configured to generate electric motor torque. The turbocharging system further includes a one-way clutch configured to selectively and operatively connect the electric motor to the compressor assembly, such that the electric motor torque assists the turbocharger in generating boost pressure. The engine may include an oil pump, and in such a case the pressurized fluid is engine oil supplied by the oil pump. The oil pump may be driven mechanically by the engine or by an electric motor.

The shaft may be a single-piece shaft element, and the compressor assembly may include a single compressor wheel.

The one-way clutch may include a mechanism configured to select a direction of coupling/clutching to thereby enable the turbine wheel rotated by the exhaust gas to rotate the shaft and, in turn, the shaft to rotate the electric motor for generating electric current by recovering energy of the exhaust gas.

The mechanism may be operated via a pressurized fluid.

The turbocharging system may additionally include a fluid pump configured to supply the pressurized fluid. The fluid pump may be an oil pump of the engine, such that the pressurized fluid is engine oil.

The shaft may include a first shaft element and a second shaft element. The compressor assembly may include a first compressor wheel mounted on the first shaft element and a second compressor wheel mounted on the second shaft element. In such a construction, the turbocharging system may additionally include a torque-transmitting device arranged between the first shaft element and the second shaft element and configured to selectively connect the first shaft element to the second shaft element.

The turbocharging system may additionally include at least one valve configured to operate the first compressor wheel and the second compressor wheel in series for pressurizing the airflow.

The turbocharging system may also include an electronic controller configured to regulate and coordinate operation of the electric motor and the one-way clutch, the torque-transmitting device, and the at least one valve.

The electric motor may be operatively connected to the compressor assembly via a transfer gear set.

The transfer gear set may have a fixed gear ratio in a range of 3:1 to 5:1.

The electric motor may have an electric power of greater than 1 Kilowatt.

Another embodiment of the invention is directed to an internal combustion engine having the turbocharging system described above.

The above features and advantages, and other features and advantages of the present disclosure, will be readily apparent from the following detailed description of the embodiment(s) and best mode(s) for carrying out the described disclosure when taken in connection with the accompanying drawings and appended claims.

BRIEF DESCRIPTION OF THE DRAWINGS

FIG. 3 is a schematic view of another embodiment of the turbocharger system shown in FIG. 1; the system specifically employing a selectable one-way clutch.

DETAILED DESCRIPTION

Figure 1:
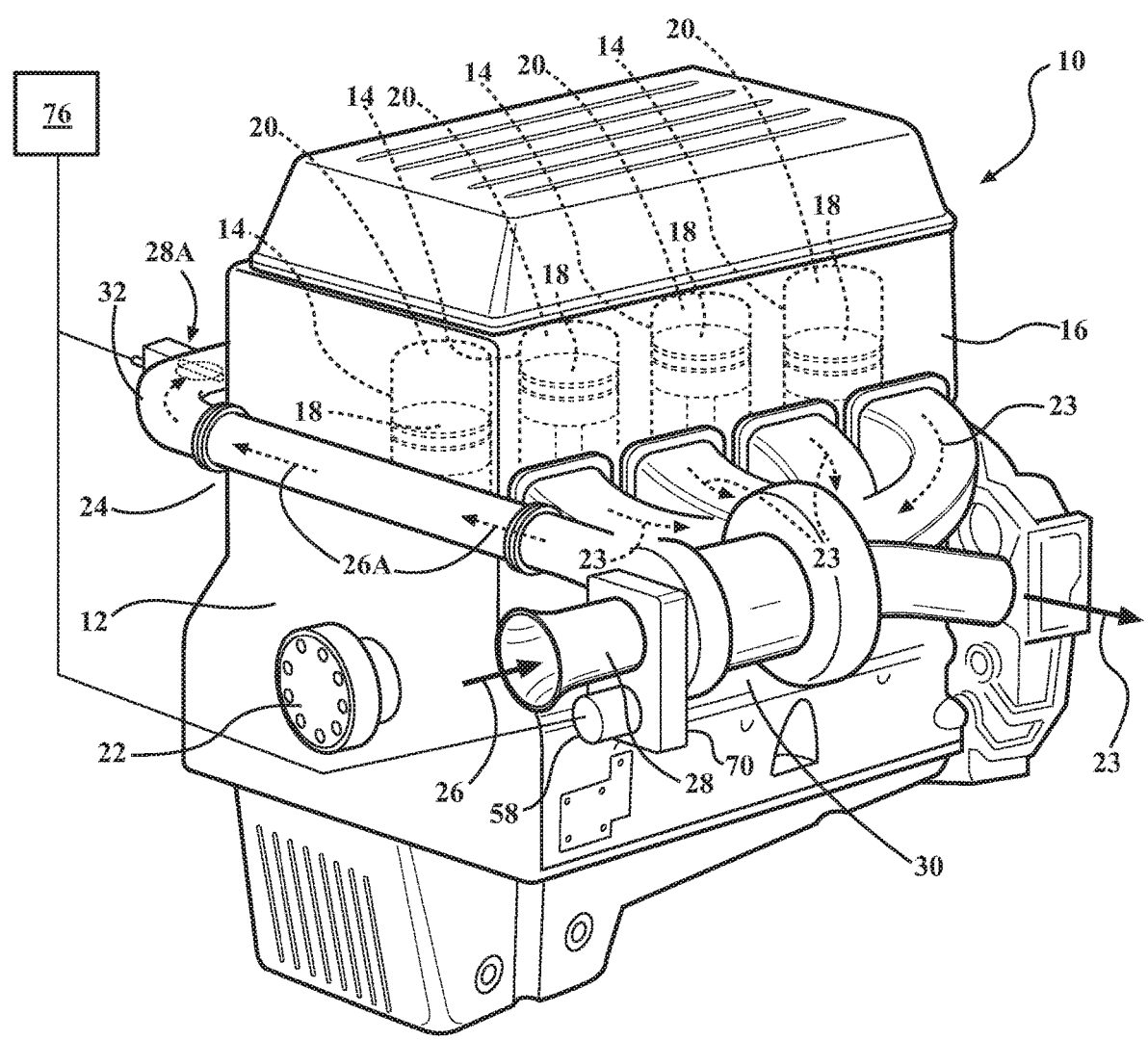
FIG. 1 is a schematic perspective view of an engine with a turbocharger system having an electrically-assisted turbocharger according to the disclosure.

Referring to the drawings wherein like reference numbers correspond to like or similar components throughout the several figures, FIG. 1 illustrates an internal combustion engine 10, which may be employed in a motor vehicle (not shown). The engine 10 also includes a cylinder block 12 with a plurality of cylinders 14 arranged therein. As shown, the engine 10 also includes a cylinder head 16. Each cylinder 14 includes a piston 18 configured to reciprocate therein.

Combustion chambers 20 are formed within the cylinders 14 between the bottom surface of the cylinder head 16 and the tops of the pistons 18. As known by those skilled in the art, combustion chambers 20 are configured to receive a fuel-air mixture for subsequent combustion therein. The engine 10 also includes a crankshaft 22 configured to rotate within the cylinder block 12. The crankshaft 22 is rotated by the pistons 18 as a result of an appropriately proportioned fuel-air mixture being burned in the combustion chambers 20. After the fuel-air mixture is burned inside a specific combustion chamber 20, the reciprocating motion of a particular piston 18 serves to expel post-combustion exhaust gas 23 from the respective cylinder 14.

As shown in FIG. 1, the engine 10 also includes an induction system 24 configured to channel airflow 26 from the ambient to the cylinders 14. The induction system 24 includes intake air ducting 28, a turbocharging system 30, and an intake manifold 32. Although not shown, the induction system 24 may additionally include an air filter upstream of the turbocharging system 30 for removing foreign particles and other airborne debris from the airflow 26, and, typically downstream of the turbocharging system, a throttle 28A configured to control the amount of airflow 26 supplied to the cylinders 14. The intake air ducting 28 is generally configured to channel the airflow 26 from the ambient to the turbocharging system 30 and also route the airflow aft of the turbocharging system. The turbocharging system 30 is configured to pressurize the ambient airflow 26, and discharge the pressurized airflow 26A to the intake manifold 32. The intake manifold 32 in turn distributes the previously pressurized airflow 26A to the cylinders 14 for mixing with an appropriate amount of fuel and subsequent combustion of the resultant fuel-air mixture.

As shown in FIGS. 2-5, the turbocharging system 30 includes an electrically-assisted turbocharger 34. The turbocharger 34 includes a shaft 36 supported for rotation about an axis 40 via bearings generally indicated at 42 (shown in FIG. 2). The bearings 42 are mounted in a bearing housing 44 and may be lubricated by a supply of oil. The bearings 42 may be journal-, ball-, air foil, or magnetic-type. The shaft 36 may be a single-piece shaft (shown in FIGS. 2-3), or a two-piece component having a first shaft element 36-1 and a second shaft element 36-1 (shown in FIGS. 4-5), the significance of which will be described in detail below. A turbine wheel 46 is mounted on the shaft 36 and configured to be rotated about the axis 40 by the exhaust gas 23 emitted from the cylinders 14. The turbine wheel 46 is disposed inside a turbine housing 48 that includes a turbine volute or scroll 50. The scroll 50 receives the post-combustion exhaust gas 23 and directs the exhaust gas to the turbine wheel 46. The scroll 50 is configured to achieve specific performance characteristics, such as efficiency and response, of the turbocharger 30. The turbocharger 34 may also include a waste-gate valve 51 to limit operational speeds of the turbine wheel 46 in order to maintain turbocharger boost within prescribed limits and prevent turbine wheel over speed.

The turbocharger 30 also includes a compressor assembly 52 mounted on the shaft 36 and configured to pressurize the airflow 26 being received from the ambient for eventual delivery to the cylinders 14. The compressor assembly 52 may include a single, first compressor wheel 52-1 (shown in FIGS. 2-3), or include the first compressor wheel 52-1 and a second compressor wheel 52-2 (shown in FIGS. 4-5), the significance of which will be described in detail below. The first compressor wheel 52-1 is disposed inside a first compressor housing or cover 54-1 that includes a first volute or scroll 56-1. The first scroll 56-1 receives the airflow 26 from the first compressor wheel 52-1 after the airflow has been compressed. The first scroll 56-1 is configured to achieve specific performance characteristics, such as peak airflow and efficiency of the turbocharger 30. Accordingly, rotation is imparted to the shaft 36 by the post-combustion exhaust gas 23 energizing the turbine wheel 46, and is in turn communicated to the first compressor wheel 52-1 owing to the first compressor wheel being fixed on the shaft. The variable flow and force of the post-combustion exhaust gas 23 influences the amount of boost pressure that may be generated by the first compressor wheel 52-1 throughout the operating range of the engine 10.

Figure 2:
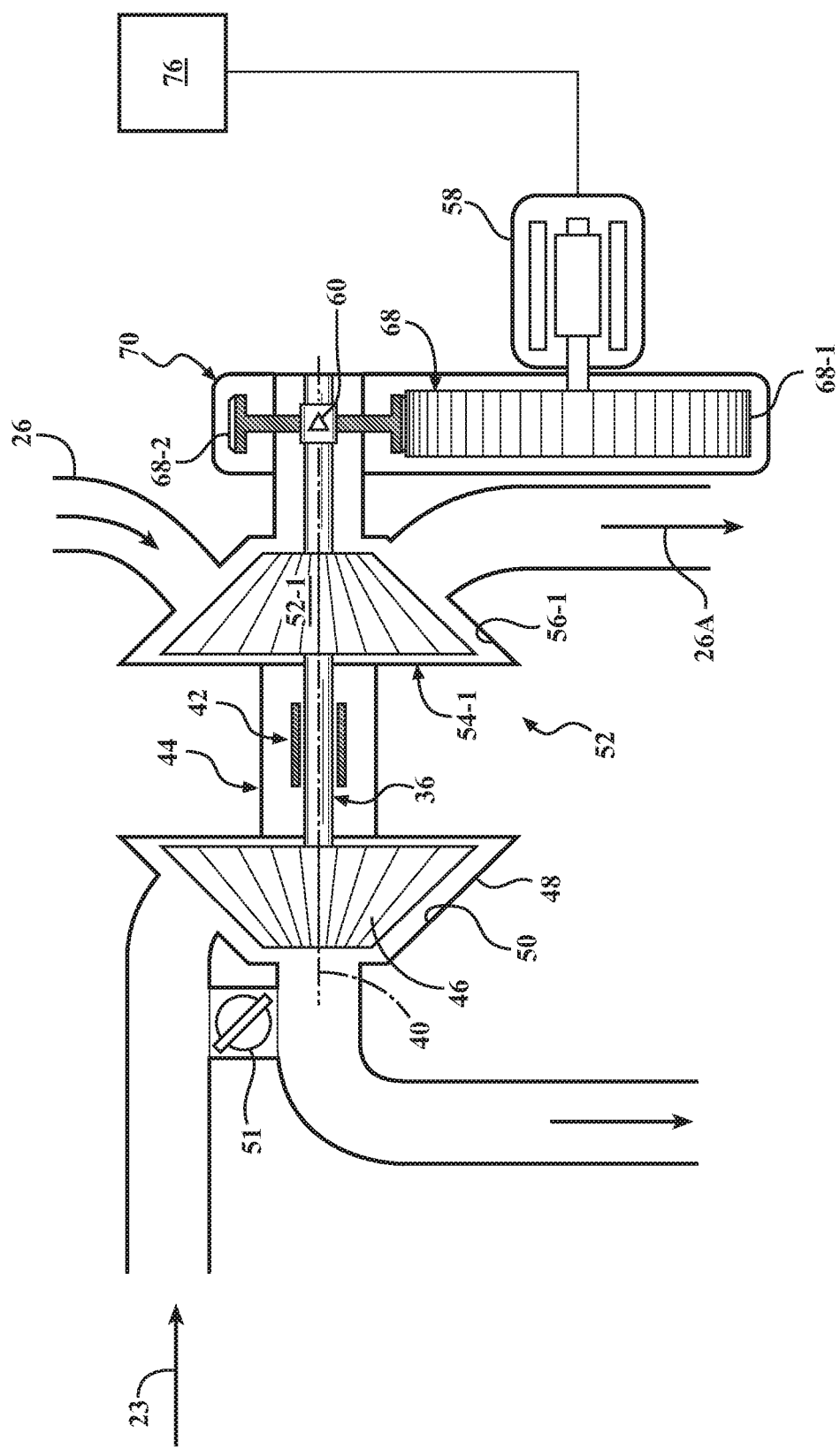
FIG. 2 is a schematic view of a particular embodiment of the turbocharger system shown in FIG. 1; the system specifically employing a one-way clutch.
Figure 3:
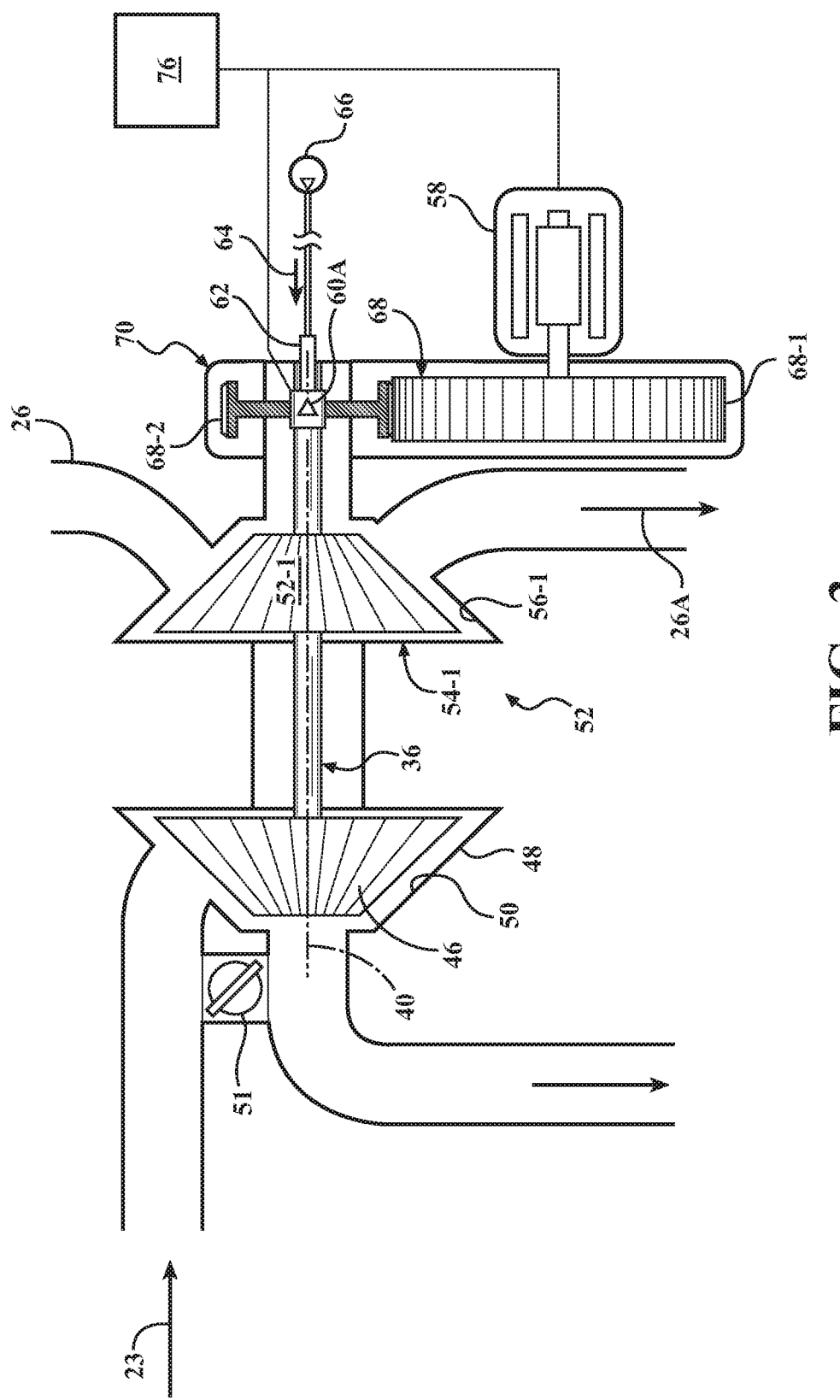
FIG. 3 is a schematic view of another embodiment of the turbocharger system shown in FIG. 1.

As shown in FIGS. 2-3, the turbocharging system 30 also includes an electric motor 58. The electric motor 58 is configured to generate an electric motor torque T with which to assist the turbocharger 34. The electric motor 58 may have an electric power of at least 1 Kilowatt. The turbocharging system 30 additionally includes a one-way clutch 60 configured to operatively and selectively connect the electric motor 58 to the compressor assembly 52, such that the electric motor torque T is permitted to assist the turbocharger 34 in generating boost pressure. Specifically, the electric motor torque T may be employed to enhance the response of turbocharger 34 when the mass flow rate of the post-combustion exhaust gas 23 is low, such as at lower engine 10 speeds, for example below 2,000 RPM.

As shown in FIG. 3, the one-way clutch may be configured as a selectable bi-directional clutch specifically identified via numeral 60A. Specifically, the selectable one-way clutch 60A may include a mechanism 62 configured to select a direction of coupling or clutching, and, accordingly, the direction of freewheel or overrun, to thereby enable the turbine wheel 46 rotated by the exhaust gas 23 to rotate the shaft 36 and, in turn, the shaft to rotate the electric motor 58 for generating electric current. As a result, in such a mode of operation, the selectable one-way clutch 60A may enable recovery of energy of the exhaust gas 23 when boost from the turbocharging system is not required, such as during coast down or at high-load steady state engine operation, for example during highway cruising of the vehicle. The mechanism 62 may be operated via a pressurized fluid 64. The pressurized fluid 64 may be supplied to the mechanism 62 by a dedicated fluid pump 66, or the pump 66 may be an oil pump of the engine 10, in which case the pressurized fluid 64 used to operate the mechanism 62 will be engine oil.

Figure 4:
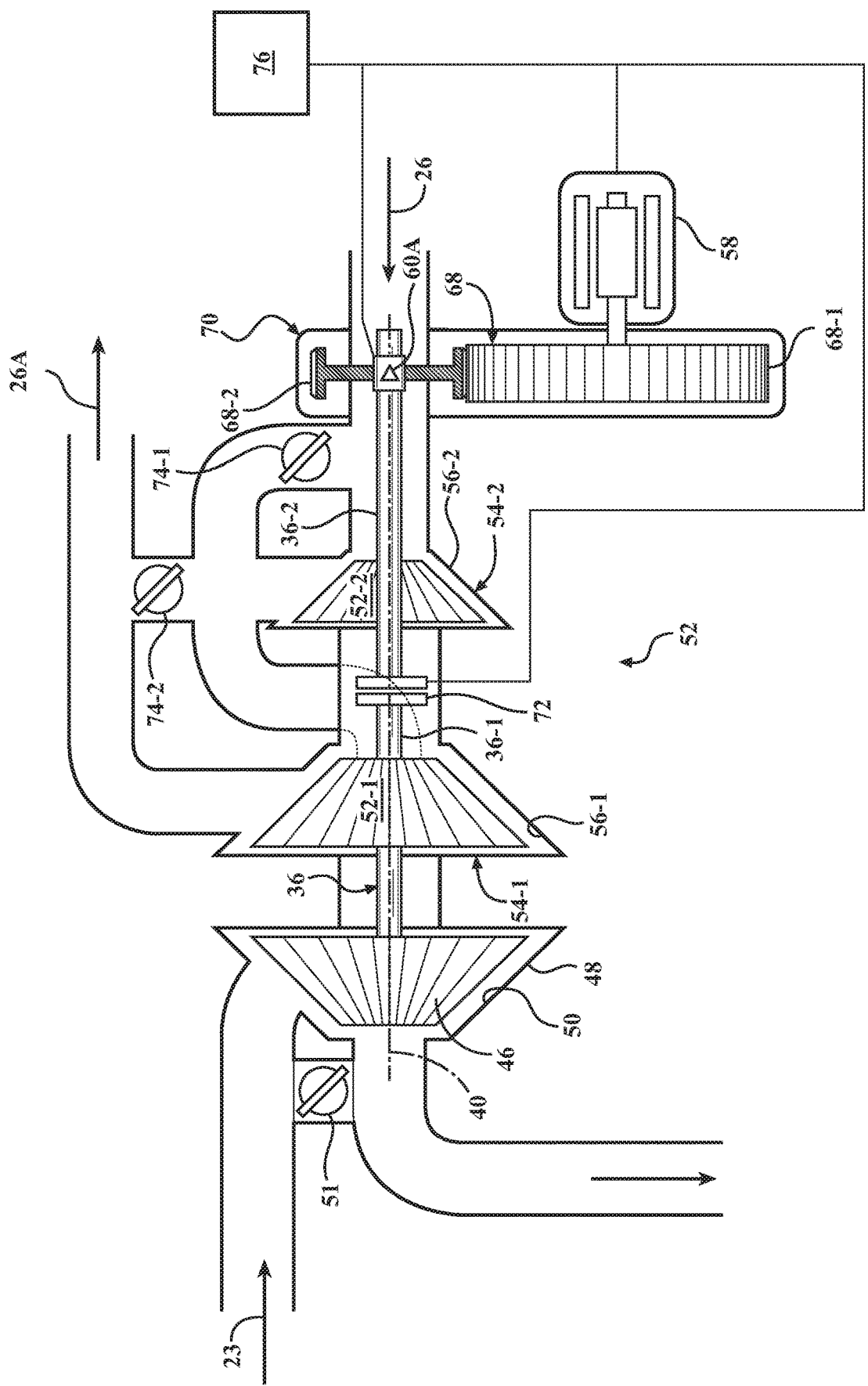
FIG. 4 is a schematic view of yet another embodiment of the turbocharger system shown in FIG. 1; the system specifically employing two compressor wheels, a torque transmitting device for synchronizing operation of the two compressor wheels, and two individual valves for directing airflow between and from the two compressor wheels.
Figure 5:
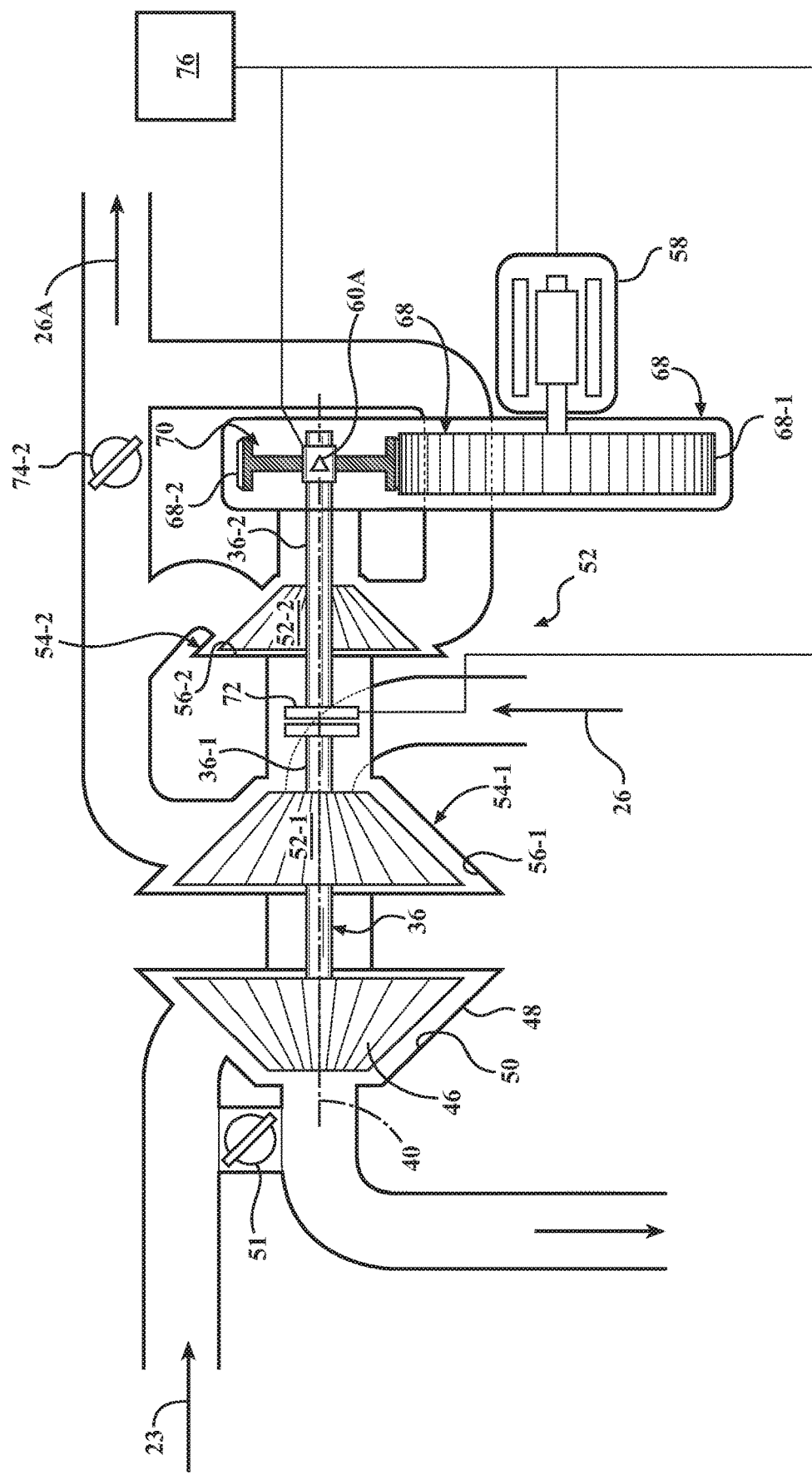
FIG. 5 is a schematic view of yet another embodiment of the turbocharger system shown in FIG. 1; the system specifically employing two compressor wheels, a torque transmitting device for synchronizing operation of the two compressor wheels, and a single valve for selectively directing pressurized airflow from the two compressor wheels.

As shown in FIGS. 2-5, the electric motor 58 may be operatively connected to the compressor assembly 52 via a transfer gear set 68. As shown, the transfer gear set 68 may include a first gear 68-1 driven via the electric motor 58 and in mesh with a second gear 68-2. The second gear 68-2 is, in turn, configured to rotate the compressor assembly 52, specifically the first compressor wheel 52-1, as shown in FIGS. 2-3, or the second compressor wheel 52-2, as shown in FIGS. 4-5. The transfer gear set 68 may have a fixed gear ratio in a range of 3:1 to 5:1 for effective gear reduction in order to impart appropriate rotating speed to the compressor assembly 52 to pressurize the airflow 26 commensurate with the performance, i.e., torque output, required of the engine 10. The transfer gear set 68 may be encased in a self-lubricated housing 70 which may be fixed to the compressor housing 54.

As noted above, and as shown in FIGS. 4-5, the compressor assembly 52 may include both the first compressor wheel 52-1 and the second compressor wheel 52-2. As shown, the first compressor wheel 52-1 is mounted on the first shaft element 36-1 and the second compressor wheel 52-2 is mounted on the second shaft element 36-2. The second compressor wheel 52-2 is disposed inside a second compressor housing or cover 54-2 that includes a second volute or scroll 56-2. The second scroll 56-2 receives the airflow 26 from the second compressor wheel 52-2 after the airflow has been compressed. Similar to the first compressor scroll 56-1, the second scroll 56-2 is also configured to achieve specific performance characteristics, such as peak airflow and efficiency of the turbocharger 30 specifically tailored for the operating range of the second compressor wheel 52-2. In the embodiment shown in FIGS. 4-5, the turbocharging system 30 also includes a torque-transmitting device 72 arranged between the first shaft element 36-1 and the second shaft element 36-2. The torque-transmitting device 72 is configured to selectively connect the first shaft element 36-1 to the second shaft element 36-2, and thereby connect the first compressor wheel 52-1 to the second compressor wheel 52-2 for synchronous rotation thereof.

The turbocharging system 30 may additionally include one or more valves configured to operate the first compressor wheel 52-1 and the second compressor wheel 52-2 in series for selectively pressurizing the airflow 26. Specifically, as shown with respect to the embodiment of FIG. 4, the turbocharging system 30 may include a first valve 74-1 configured to selectively direct the airflow 26 to the first compressor wheel 52-1 or to the second compressor wheel 52-2. As additionally shown in FIG. 4, the turbocharging system 30 may include a second valve 74-2 configured to selectively direct the pressurized airflow 26A from the first compressor wheel 52-1 or from the second compressor wheel 52-2 to the intake manifold 32. As shown with respect to the embodiment of FIG. 5, the turbocharging system 30 may include the second valve 74-2, but not the first valve 74-1. Similar to the embodiment of FIG. 4, in the embodiment of FIG. 5 the second valve 74-2 is configured to selectively direct the pressurized airflow 26A to the intake manifold 32 from either the first compressor wheel 52-1 or from the second compressor wheel 52-2. Accordingly, the valves 74-1, 74-2 direct the ambient airflow 26 and the pressurized airflow 26A between the first and second compressor wheels 52-1, 52-2 and through the intake air ducting 28.

As shown in FIGS. 2-5, the turbocharging system 30 also includes an electronic controller 76. The electronic controller 76 is in operative communication with the electric motor 58, the selectable one-way clutch 60A, and the torque-transmitting device 72, and the valves 74-1, 74-2, and is configured to regulate and coordinate operation thereof. The controller 76 may be is configured, i.e., constructed and programmed, to regulate operation of the engine 10. In an embodiment where the engine 10 is installed in the vehicle, the controller 76 may be configured as a central processing unit (CPU) intended to regulate other vehicle systems (not shown) in addition to the operation of the engine 10. In order to appropriately control operation of the engine 10 and other vehicle systems, the controller 76 may include a memory, at least some of which is tangible and non-transitory. The memory may be a recordable medium that participates in providing computer-readable data or process instructions. Such a medium may take many forms, including but not limited to non-volatile media and volatile media.

Non-volatile media for the controller 76 may include, for example, optical or magnetic disks and other persistent memory. Volatile media may include, for example, dynamic random access memory (DRAM), which may constitute a main memory. Such instructions may be transmitted by one or more transmission mediums, including coaxial cables, copper wire and fiber optics, including the wires that comprise a system bus coupled to a processor of a computer. Memory of the controller 76 may also include a floppy disk, a flexible disk, hard disk, magnetic tape, another magnetic medium, a CD-ROM, DVD, other optical medium, etc. The controller 76 may be configured or equipped with other required computer hardware, such as a high-speed clock, requisite Analog-to-Digital (A/D) and/or Digital-to-Analog (D/A) circuitry, input/output circuitry and devices (I/O), as well as appropriate signal conditioning and/or buffer circuitry. Any algorithms required by the controller 76 or accessible thereby may be stored in the memory and automatically executed to provide the required functionality.

The controller 76 may be specifically configured to determine and affect appropriate operation of the electric motor 58 and the one-way clutch 60 in the embodiment of FIGS. 2 and 3. The controller 76 may also be configured to determine and affect the appropriate sequence of operation of the electric motor 58, the one-way clutch 60, and the valves 74-1, 74-2 in the embodiment of FIG. 4. Finally, the controller 76 may be configured to determine and affect the appropriate sequence of operation of the electric motor 58, the selectable one-way clutch 60A, and the valve 74-2 in the embodiment of FIG. 5. Accordingly, the controller 76 may operate the valves 74-1, 74-2 to direct the ambient and the pressurized airflows 26, 26A relative to the first and second compressor wheels 52-1, 52-2 and through the intake air ducting 28 to facilitate series operation of the first and second compressor wheels 52-1, 52-2.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. An internal combustion engine comprising:
a cylinder configured to receive a fuel-air mixture for combustion therein;
a reciprocating piston disposed inside the cylinder and configured to expel exhaust gas from the cylinder; and
a turbocharging system including:
a turbocharger having:
a shaft supported for rotation about an axis;
a turbine wheel mounted on the shaft and configured to be rotated about the axis by the exhaust gas; and
a compressor assembly mounted on the shaft and configured to pressurize an airflow received from the ambient for delivery to the cylinder;

an electric motor configured to generate electric motor torque; and a selectable bi-directional one-way clutch configured to selectively connect the electric motor to the compressor assembly, such that the electric motor torque assists the turbocharger in generating boost pressure;

wherein the selectable bi-directional one-way clutch is operated via a pressurized oil and configured to select a direction of coupling and a direction of freewheel of the one-way clutch to thereby enable the turbine wheel rotated by the exhaust gas to rotate the shaft and, in turn, the shaft to rotate the electric motor for generating electric current.

2. The engine of claim 1, wherein:
the shaft is a single-piece shaft element, and
the compressor assembly includes a single compressor wheel.

3. The engine of claim 1, wherein the turbocharging system additionally includes a fluid pump configured to supply the pressurized oil.

4. The engine of claim 1, wherein:
the shaft includes a first shaft element and a second shaft element; and
the compressor assembly includes a first compressor wheel mounted on the first shaft element and a second compressor wheel mounted on the second shaft element;
the turbocharging system additionally includes a torque-transmitting device arranged between the first shaft element and the second shaft element and configured to selectively connect the first shaft element to the second shaft element.

5. The engine of claim 4, wherein the turbocharging system additionally includes at least one valve configured to operate the first compressor wheel and the second compressor wheel in series for pressurizing the airflow; and wherein the at least one valve includes a first valve configured to selectively direct the airflow to the first compressor wheel or to the second compressor wheel and/or a second valve configured to selectively direct the pressurized airflow from the first compressor wheel or from the second compressor wheel to the cylinder.

6. The engine of claim 5, wherein the turbocharging system additionally includes an electronic controller configured to regulate and coordinate operation of the electric motor and the one-way clutch, the torque-transmitting device, and the at least one valve.

7. The engine of claim 1, wherein the electric motor is operatively connected to the compressor assembly via a transfer gear set.

8. The engine of claim 7, wherein the transfer gear set has a fixed gear ratio in a range of 3:1 to 5:1.

9. A turbocharging system for an internal combustion engine having a cylinder configured to receive a fuel-air mixture for combustion therein and a reciprocating piston disposed inside the cylinder and configured to expel exhaust gas from the cylinder, the turbocharging system comprising:
a turbocharger having:
a shaft supported for rotation about an axis;
a turbine wheel mounted on the shaft and configured to be rotated about the axis by the exhaust gas;
a compressor assembly mounted on the shaft and configured to pressurize an airflow received from the ambient for delivery to the cylinder;
an electric motor configured to generate electric motor torque; and
a selectable bi-directional one-way clutch configured to selectively connect the electric motor to the compressor assembly, such that the electric motor torque assists the turbocharger in generating boost pressure;
wherein the selectable bi-directional one-way clutch is operated via a pressurized oil and configured to select a direction of coupling and a direction of freewheel of the one-way clutch to thereby enable the turbine wheel rotated by the exhaust gas to rotate the shaft and, in turn, the shaft to rotate the electric motor for generating electric current.

10. The turbocharging system of claim 9, wherein:
the shaft is a single-piece shaft element, and
the compressor assembly includes a single compressor wheel.

11. The turbocharging system of claim 9, further comprising a fluid pump configured to supply the pressurized oil.

12. The turbocharging system of claim 9, wherein:
the shaft includes a first shaft element and a second shaft element; and
the compressor assembly includes a first compressor wheel mounted on the first shaft element and a second compressor wheel mounted on the second shaft element;
the turbocharging system further comprising a torque-transmitting device arranged between the first shaft element and the second shaft element and configured to selectively connect the first shaft element to the second shaft element.

13. The turbocharging system of claim 12, further comprising at least one valve configured to operate the first compressor wheel and the second compressor wheel in series for pressurizing the airflow; and wherein the at least one valve includes a first valve configured to selectively direct the airflow to the first compressor wheel or to the second compressor wheel and/or a second valve configured to selectively direct the pressurized airflow from the first compressor wheel or from the second compressor wheel to the cylinder.

14. The turbocharging system of claim 13, wherein the turbocharging system additionally includes an electronic controller configured to regulate and coordinate operation of the electric motor and the one-way clutch, the torque-transmitting device, and the at least one valve.

15. The turbocharging system of claim 9, wherein the electric motor is operatively connected to the compressor assembly via a transfer gear set.

16. The turbocharging system of claim 15, wherein the transfer gear set has a fixed gear ratio in a range of 3:1 to 5:1.

* * * * *